US008132921B2

(12) United States Patent
Takeda

(10) Patent No.: US 8,132,921 B2
(45) Date of Patent: Mar. 13, 2012

(54) PROJECTION DISPLAY APPARATUS HAVING A COOLING FAN AND CONTROLLING METHOD FOR PROJECTION DISPLAY APPARATUS HAVING A COOLING FAN

(75) Inventor: Kazuyuki Takeda, Ora-gun (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 369 days.

(21) Appl. No.: 12/182,711

(22) Filed: Jul. 30, 2008

(65) Prior Publication Data

US 2009/0040469 A1    Feb. 12, 2009

(30) Foreign Application Priority Data

Aug. 10, 2007  (JP) ................................. 2007-209772

(51) Int. Cl.
    *G03B 21/26*    (2006.01)
(52) U.S. Cl. ........................................................ 353/57
(58) Field of Classification Search ............... 353/52–61
    See application file for complete search history.

(56) References Cited

U.S. PATENT DOCUMENTS

| 6,195,003 B1 * | 2/2001 | Ichikawa et al. ............. 340/506 |
| 2002/0196606 A1 | 12/2002 | Hirao et al. | |
| 2006/0145949 A1 * | 7/2006 | Hirai et al. ....................... 345/42 |
| 2006/0291994 A1 * | 12/2006 | Bok et al. ......................... 415/47 |
| 2007/0277811 A1 * | 12/2007 | Hollick ........................... 126/621 |

FOREIGN PATENT DOCUMENTS

| JP | 2-202388 | 8/1990 |
|---|---|---|
| JP | 2004-029485 | 1/2004 |
| JP | 2005-181400 | 7/2005 |
| JP | 2005-338213 | 12/2005 |
| JP | 2006-047667 | 2/2006 |
| JP | 2006-235317 | 9/2006 |
| JP | 2006301279 | 11/2006 |

OTHER PUBLICATIONS

Japanese Patent Application No. 2007-209772, Notice of Reasons for Rejection, mailed Jan. 24, 2012, (with English Translation).

* cited by examiner

*Primary Examiner* — Thanh X Luu
(74) *Attorney, Agent, or Firm* — Blakley, Sokoloff, Taylor & Zafman LLP

(57) ABSTRACT

According to one embodiment, a projection display apparatus comprises an optical system configured to modulate light from a light source in accordance with an input image signal and to project modulated light onto a screen, a cooling fan configured to cool the optical system, an error detector configured to detect a driving error of the cooling fan, a target rotation speed setting unit configured to set a target rotation speed of the cooling fan, and a target rotation speed controller configured to increase the target rotation speed of the cooling fan when the error detector detects a drive error of the cooling fan.

12 Claims, 4 Drawing Sheets

PROJECTION DISPLAY APPARATUS HAVING A COOLING FAN AND CONTROLLING METHOD FOR PROJECTION DISPLAY APPARATUS HAVING A COOLING FAN

CROSS-REFERENCE TO RELATED APPLICATIONS

This application is based upon and claims the benefit of priority from Japanese Patent Application No. 2007-209772, filed Aug. 10, 2007, the entire contents of which are incorporated herein by reference.

BACKGROUND

1. Field

One embodiment of the invention relates to a projection display apparatus and a controlling method for the projection display apparatus.

2. Description of the Related Art

A projection display apparatus (projector) is a display apparatus that displays image information on a large screen. In the projection display apparatus, light which is emitted from a light source such as a high-pressure mercury lamp is modulated by use of a modulator such as a liquid crystal panel, and is projected on a screen through a projection lens. Since the light source lamp of the projection display apparatus generates a large amount of heat, the lamp needs to be cooled by a cooling fan.

The rotation speed of the cooling fan is generally set according to temperature. However, depending upon the temperature at start-up, the cooling fan may not be able to start normally. Jpn. Pat. Appln. KOKAI Publication No. 2006-301279 discloses an image forming apparatus such as a laser beam printer which, immediately after the apparatus is started, controls rotation of a cooling fan of a fixing roller to shorten a preheating time for the fixing roller. In the image forming apparatus, a drive voltage that is approximately twice the normal drive voltage is applied to the cooling fan for a preset period of time after the power source is turned on. Since the fixing roller needs to be preheated, the cooling capacity becomes to be lowered, when the preset period of time has elapsed, by setting the drive voltage of the cooling fan lower than the normal drive voltage.

Generally, grease is used as lubricant for a fan motor of a cooling fan in a projection display apparatus. When the projection display apparatus is used in low temperature environment, for example, below the freezing point, the grease is cooled to be hardened and fixed, which obstructs the rotation of the fan in some cases.

With the above technique, the drive voltage of the cooling fan is set higher than the normal drive voltage immediately after the power source is turned on. However, in the temperature condition which allows the cooling fan to be driven normally, it is not necessary to enhance significantly the drive voltage of the cooling fan immediately after the power source is turned on.

Further, with the above technique, the drive voltage of the cooling fan is set higher than the normal drive voltage only for the preset period of time after the power source is turned on. However, in the case where the apparatus is used in the low temperature environment, the hardened and fixed grease may not be softened enough even though the drive voltage is raised for the preset period of time and, failing to normalize the cooling fan in some cases.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, a projection display apparatus comprises an optical system configured to modulate light from a light source in accordance with an input image signal and to project modulated light onto a screen, a cooling fan configured to cool the optical system, an error detector configured to detect a driving error of the cooling fan, a target rotation speed setting unit configured to set a target rotation speed of the cooling fan, and a target rotation speed controller configured to increase the target rotation speed of the cooling fan when the error detector detects a drive error of the cooling fan.

Embodiments of a projection display apparatus according to the present invention will now be described with reference to the accompanying drawings.

First Embodiment

Figure 1:
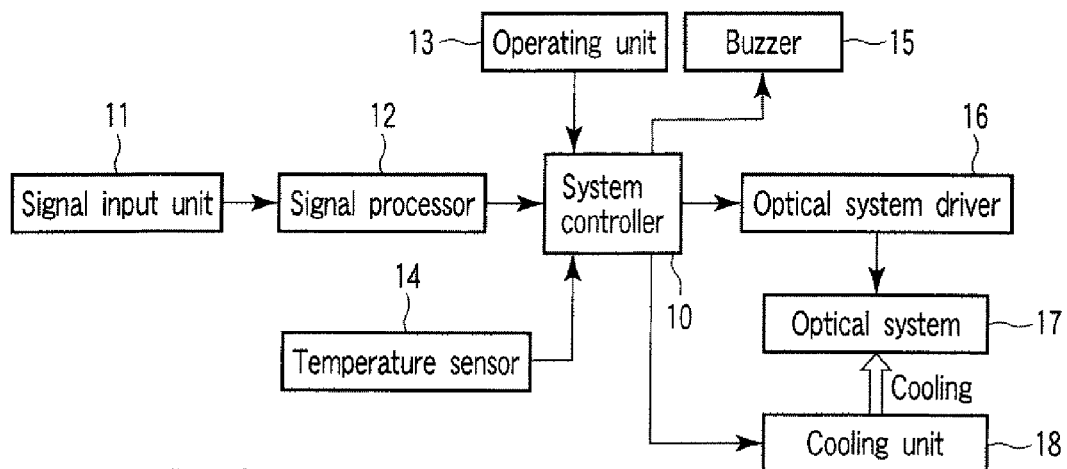
FIG. 1 is an exemplary block diagram showing an electronic configuration of a projection display apparatus according to an embodiment of the invention.

FIG. 1 is an exemplary block diagram showing an electronic configuration of a projection display apparatus according to a first embodiment of the invention.

A system controller 10 includes a CPU and storage device such as a ROM and a RAM, which are not shown in the drawings. The system controller 10 controls the operations of whole components of the projection display apparatus in accordance with a control program stored in the storage device. A storage area to store the number E of times of error detection is provided in the RAM in the system controller 10. The initial value of the number E of error detection is set to zero.

A signal input unit 11 includes image signal input terminals for plural input lines including an S-video terminal, a DVI-I terminal, and a D-sub terminal. The signal input unit 11 receives an image signal such as an RGB signal, a video signal, an image signal from a personal computer (PC), and an image signal from an optical disk apparatus such as a DVD drive, via the above image signal input terminals. An image signal input to the signal input unit 11 is sent to a signal processor 12. The signal processor 12 performs predetermined signal processing on the input image signal, and converts the signal into an image signal having a format corresponding to display elements of an optical system 17.

An operation unit 13 includes a power button, various function buttons, a display panel and the like. The user can supply an operation instruction to the system controller 10 by operating the operation unit 13.

A temperature sensor 14 measures an environmental temperature and notifies the system controller 10 of the measured temperature.

A buzzer 15 generates alarm sound under the control of the system controller 10 and notifies the user of occurrence of an error and the like.

An optical system driver 16 drives an optical system 17 under the control of the system controller 10. The optical system 17 includes a light source lamp, an optical engine and a projection lens. For example, a high-pressure mercury lamp is used as the light source lamp. A three-LCD system which uses three liquid crystal panels may be employed as a projection system of the optical engine by way of example. The optical engine modulates light emitted from the light source lamp according to an input image signal. The modulated light is projected onto a screen through the projection lens.

A cooling unit 18 cools the optical system 17. The cooling unit 18 includes a cooling fan and a duct. The system controller 10 can adjust the cooling capacity of the cooling unit 18 by controlling the rotation speed of the cooling fan.

When the environmental temperature is high, the rotation speed of the cooling fan needs to be kept high in order to maintain the cooling capacity of the cooling unit 18 also high. However, when the environmental temperature is low, the cooling capacity of the cooling unit 18 can be set low. A target rotation speed (2000 to 3000 rpm) of the cooling fan of the cooling unit 18 is determined based on the environmental temperature detected by the temperature sensor 14. The system controller 10 makes the rotation speed of the cooling fan to be converged on the target rotation speed by feedback-control.

Figure 2:
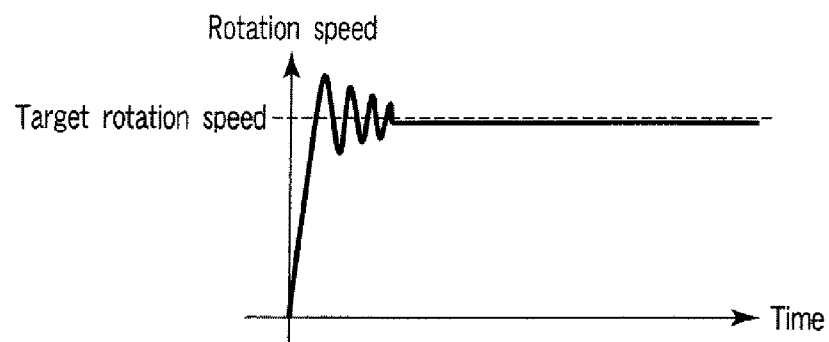
FIG. 2 is an exemplary view schematically showing an example of a temporal change in rotation speed of a cooling fan in normal utilization environment.

FIG. 2 is an exemplary view showing schematically an example of a temporal change in the rotation speed of the cooling fan in normal utilization environment (at normal temperature). The rotation speed of the fan is converged over time by feedback-control on the target rotation speed which is set based on the environmental temperature.

Figure 3:
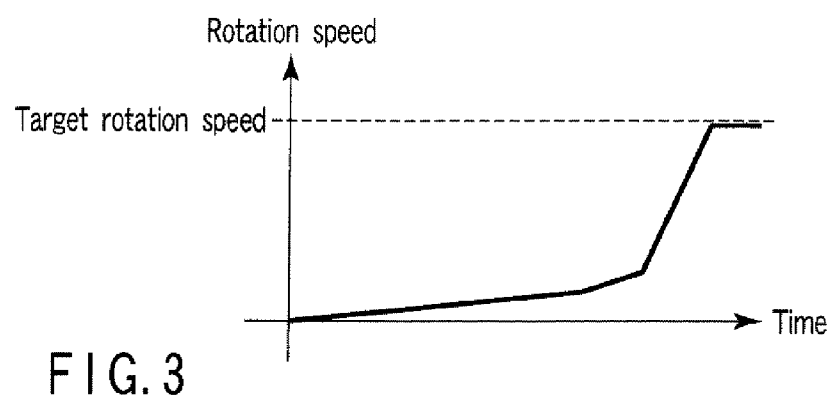
FIG. 3 is an exemplary view schematically showing an example of a temporal change in the rotation speed of the cooling fan in low-temperature environment.

FIG. 3 is an exemplary view showing schematically an example of temporal change in the rotation speed of the cooling fan in low-temperature environment.

In a cold district, the projection display apparatus may be activated in a low-temperature environment, e.g., below the freezing point. For instance, when the projection display apparatus is brought into the interior from outdoors, which is below the freezing point, started is the cold projection display apparatus. Generally, grease is applied as lubricant on the rotation shaft of the fan motor of the cooling fan. When the projection display apparatus is utilized in the low temperature environment, e.g., below the freezing point, the grease is cooled and fixedly solidified on the rotation shaft, which obstructs the rotation of the fan. Therefore, the cooling fan cannot be correctly started in some cases.

As shown in FIG. 3, it takes a relatively long time for the rotation speed of the fan to reach the target rotation speed in the low-temperature environment irrespective of the feedback-control by the system controller 10. This is because the grease used as the lubricant of the fan motor is cooled and hardened, and obstructs the rotation of the fan. Therefore, the controller 10 of the projection display apparatus detects abnormality in the fan drive operation and usual activation may not be conducted. In order to normalize driving of the cooling fan, it is necessary to soften the fixed grease.

Figure 4:
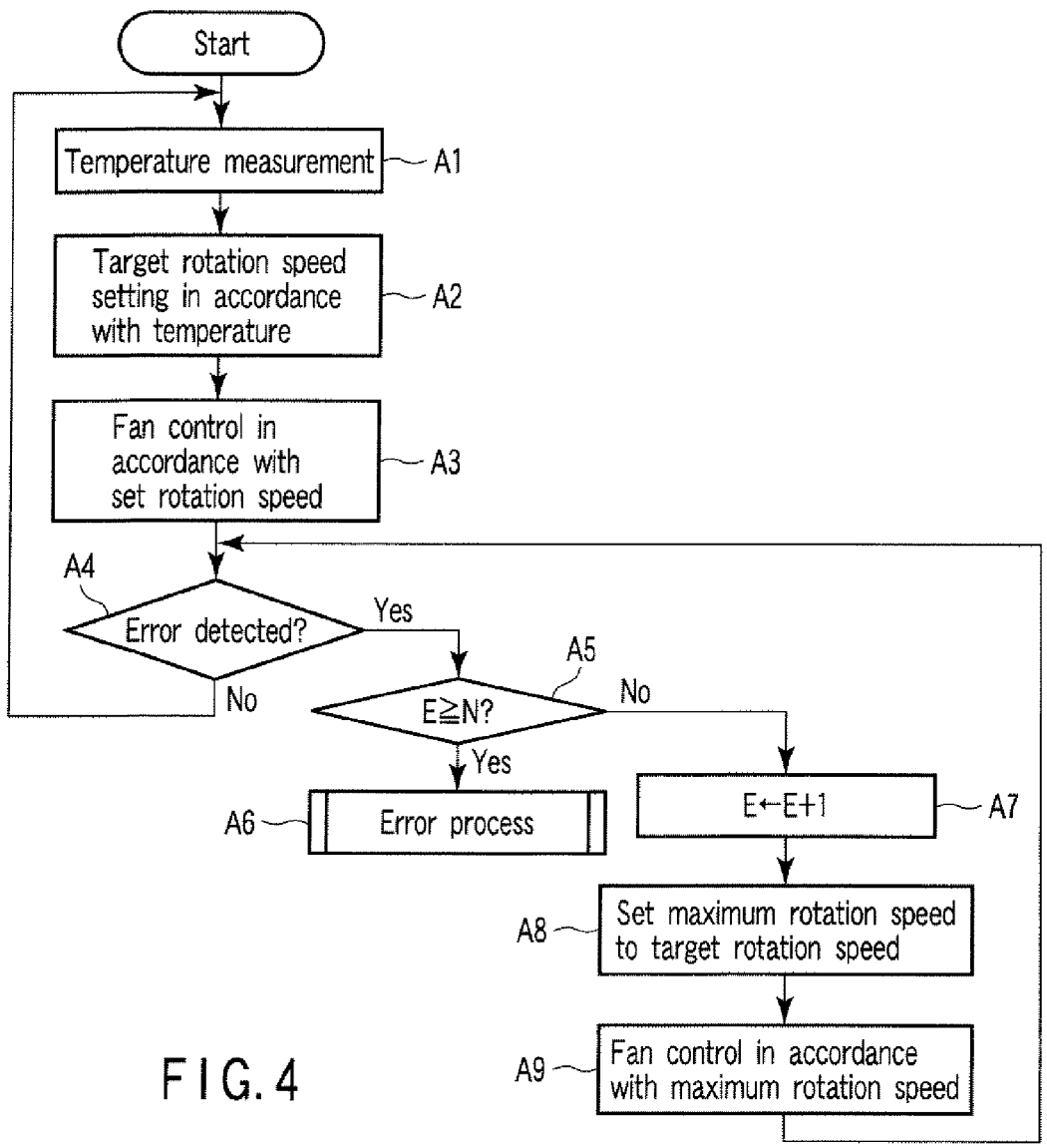
FIG. 4 is an exemplary flowchart illustrating a cooling fan drive process according to a first embodiment.

Next, the operation of the projection display apparatus having the above configuration according to the first embodiment will be explained. FIG. 4 is an exemplary flowchart illustrating the cooling fan drive process according to the first embodiment of the projection display apparatus.

When the projection display apparatus is activated, the temperature sensor 14 measures an environmental temperature (block A1). The measured temperature is notified to the system controller 10. The system controller 10 sets the target rotation speed (2000 rpm to 3000 rpm) of the cooling fan of the cooling unit 17 in accordance with the measured temperature (block A2). When the measured temperature is high, the target rotation speed is set high, and when the measured temperature is low, the target rotation speed is set low.

The system controller 10 controls driving of the cooling fan by feedback-control based on the set target rotation speed (block A3). The rotation speed of the cooling fan is controlled so that a difference between the target rotation speed and the actual rotation speed becomes zero.

The system controller 10 detects a driving error of the cooling fan (block A4). When grease is fixedly solidified on the rotation shaft in the low-temperature environment and obstructs the rotation of the fan, the rotation speed of the cooling fan cannot rise. When the actual rotation speed of the cooling fan is equal to or lower than a preset threshold rotation speed (1000 rpm, for example), it is determined that a driving error has occurred.

When a driving error of the cooling fan is not detected by the system controller 10, namely, when the actual rotation speed of the cooling fan is higher than the preset threshold rotation speed (NO in block A4), the system controller 10 repeats the processing from block A1 and the cooling fan is driven by the feedback-control depending on the temperature.

When the system controller 10 detects a driving error of the cooling fan, that is, when the actual rotation speed of the cooling fan is equal to or lower than the preset threshold rotation speed (YES in block A4), the system controller 10 reads out a value of the number E of error detection stored in the RAM and determines whether or not the read-out number E of error detection is equal to or larger than a preset value N (N=3, for example) (block A5).

When the number E of error detection is equal to or larger than N (YES in block A5), it is determined that the cooling fan has a trouble and the system controller 10 performs preset error process (block A6). The system controller 10, for example, notifies the user that the cooling fan has a trouble by causing the buzzer 15 to generate an alarm sound, and turns off the power source of the projection display apparatus.

When the number E of times of error detection is smaller than N (NO in block A5), the system controller 10 increments the value of the number E of error detection by 1 and stores the result into the storage area provided in the RAM (block A7). Afterward, the system controller 10 provides the cooling fan with a maximum rotation speed of the fan (about 4000 rpm) as the target rotation speed (block A8). Maximum voltage is applied to the cooling fan and the cooling fan is controlled with the feedback-control in order that the rotation speed of the cooling fan comes to the maximum rotation speed (block A9). Then, the flow returns to block A4.

When the maximum rotation speed (4000 rpm, for example) is set as the target rotation speed of the cooling fan, rotation torque of the motor of the cooling fan is raised. As a result, the fixedly solidified grease is gradually softened so as not to obstruct the rotation of the cooling fan.

Thereafter, even in the case where a driving error of the cooling fan is newly detected (YES in block A4), the processing from block A7 to block A9 is repeated until the number E of error detection becomes equal to or larger than N. Even when the grease is fixedly solidified on the rotation shaft and is difficult to be softened, the maximum rotation speed can be set as the target rotation speed to sufficiently soften the grease by means of adequately setting the value of N. Once the rotation speed of the cooling fan rises and the grease is softened, the grease will not be solidified again owing to heat generated by friction of the motor, heat generated by the lamp and the like.

When the actual rotation speed of the cooling fan exceeds the threshold rotation speed (NO in block A4), the flow returns to block A1. The target rotation speed of the cooling fan is set in accordance with the temperature measured in block A1 by the temperature sensor 14 (block A2), and the driving of the cooling fan is controlled based on the set rotation speed by means of the feedback-control (block A3). As described above, driving of the cooling fan is normalized even in the low-temperature environment.

Figure 5:
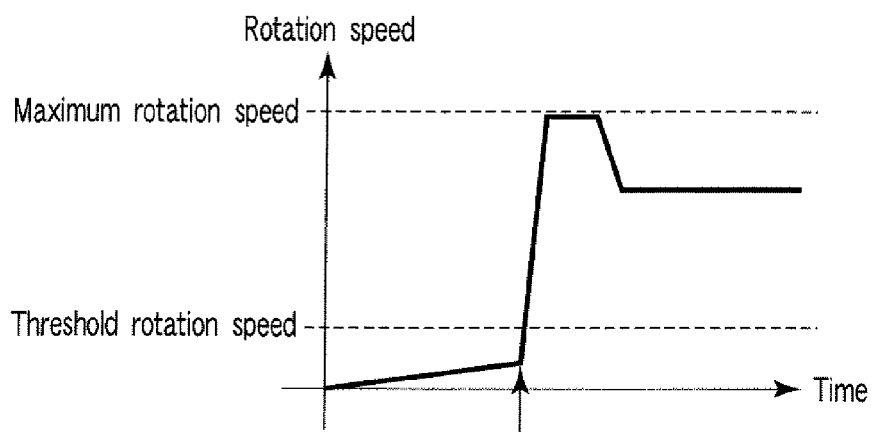
FIG. 5 is an exemplary view schematically showing an example of a temporal change in the rotation speed of the fan when the cooling fan drive process according to the first embodiment is performed in the low-temperature environment.

FIG. 5 is an exemplary view showing schematically an example of a temporal change in the rotation speed of the fan when the cooling fan drive process according to the present embodiment is performed in the low-temperature environment. When the system controller 10 detects a driving error of the cooling fan, the target rotation speed of the cooling fan is set to the maximum rotation speed of the cooling fan. When the grease is softened and the rotation speed exceeds the threshold rotation speed, the rotation speed of the fan is controlled to be converged on the target rotation speed by means of the feedback-control based on the target value which is set depending on the temperature.

As described above, in the present embodiment, the target rotation speed of the cooling fan is set in accordance with the environmental temperature. When the solidified grease obstructs rotation of the cooling fan and the rotation speed of the cooling fan does not reach the target rotation speed, a driving error of the cooling fan is detected. When the driving error of the cooling fan is detected, the system controller 10 sets the target rotation speed of the cooling fan to the maximum rotation speed of the cooling fan. The grease is softened due to an increase in the rotation torque of the motor, and the drive operation of the cooling fan can be normalized. Therefore, according to the projection display apparatus of the present embodiment, driving of the cooling fan can be normalized even in the low-temperature environment.

In the present embodiment, the temperature sensor 14 is used to measure the environmental temperature in block A1. However, the temperature sensor 14 may measure the internal temperature of the projection display apparatus. In this case, the target rotation speed of the cooling fan is set based on the internal temperature measured by the temperature sensor 14. Alternatively, the temperature sensor 14 may measure both of the environmental temperature and the internal temperature of the projection display apparatus. The target rotation speed of the cooling fan may be set based on a combination of both of the measured temperatures.

In the present embodiment, when the system controller 10 detects an error of the cooling fan, the system controller 10 sets the maximum rotation speed of the cooling fan as the target rotation speed of the cooling fan. However, the target rotation speed may be set to a rotation speed other than the maximum rotation speed of the cooling fan, provided the set rotation speed allows the solidified grease to be softened.

Second Embodiment

Next, a second embodiment of the present invention will be explained. In the following embodiment, portions which correspond to those of the first embodiment are denoted by corresponding reference numbers and the detailed explanation thereof is omitted. The configuration of the second embodiment is shown by the block diagram of FIG. 1.

In the first embodiment, when a driving error of the cooling fan is detected, the system controller 10 sets the maximum rotation speed as the target rotation speed of the cooling fan. However in the present embodiment, the target rotation speed of the cooling fan is set to the maximum rotation speed in the case where the environmental temperature immediately after the startup is low and solidifies the grease. After the solidified grease is softened by thus set rotation speed, the rotation of the fan is normalized.

Figure 6:
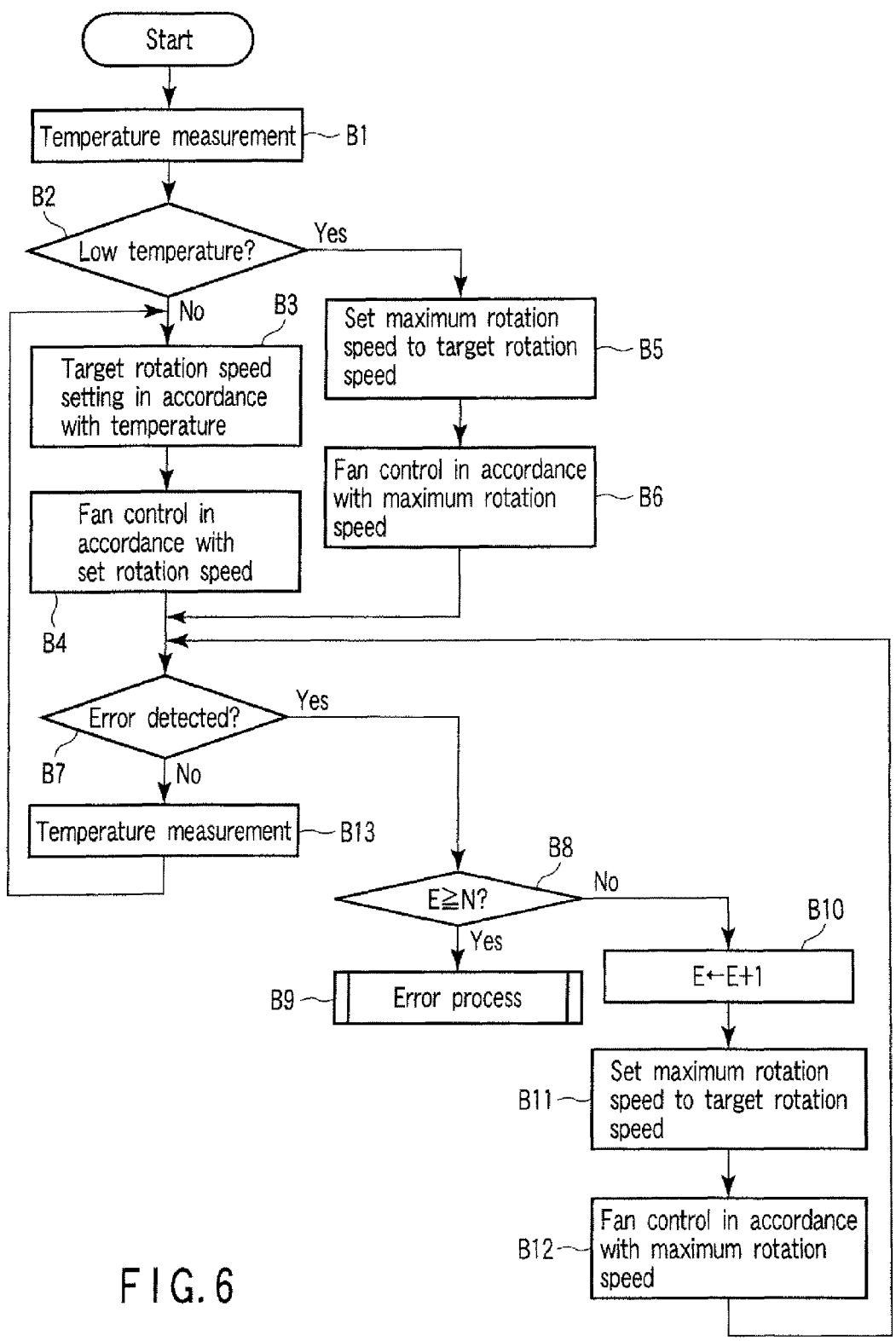
FIG. 6 is an exemplary flowchart illustrating a cooling fan drive process according to a second embodiment.

FIG. 6 is an exemplary flowchart illustrating a cooling fan drive process according to the second embodiment of the projection display apparatus.

When the projection display apparatus is activated, the temperature sensor 14 measures an environmental temperature (block B1). The measured temperature is notified to the system controller 10. The system controller 10 determines whether or not the measured temperature is such a low temperature (for example, 0° C. or lower) as to cause grease to be solidified (block B2).

When it is determined that the measured temperature is not such a low temperature (NO in block B2), the system controller 10 sets the target rotation speed (2000 rpm to 3000 rpm) of the cooling fan of a cooling unit 17 in accordance with the measured temperature (block B3). When the measured temperature is high, the target rotation speed is set high, and when the measured temperature is low, the target rotation speed is set low.

The system controller 10 controls driving of the cooling fan by feedback-control based on the set target rotation speed (block B4). The rotation speed of the cooling fan is controlled so that a difference between the target rotation speed and the actual rotation speed comes to be zero.

On the other hand, when the measured temperature is such a low temperature as to cause the grease to be solidified (YES in block B2), the system controller 10 sets the maximum rotation speed (about 4000 rpm) of the cooling fan as the target rotation speed (block B5). Maximum voltage is applied to the cooling fan and the rotation speed thereof is controlled to become thus set maximum rotation speed (block B6).

When the maximum rotation speed (4000 rpm, for example) is set as the target rotation speed of the cooling fan and rotation torque is increased, the solidified grease is gradually softened so as not to obstruct the rotation of the cooling fan.

Subsequently, the system controller 10 detects a driving error of the cooling fan (block B7). When the grease is fixedly solidified in the low-temperature environment and obstructs the rotation of the cooling fan, the rotation speed of the cooling fan cannot be raised. When the actual rotation speed of the cooling fan is equal to or lower than a preset threshold rotation speed (1000 rpm, for example), it is determined that a driving error has occurred.

When a driving error of the cooling fan is not detected by the system controller 10, namely, when the actual rotation speed of the cooling fan is higher than the preset threshold rotation speed (NO in block B7), the temperature sensor 14 measures an environmental temperature and notifies the system controller 10 of the measured temperature (block B13). Thereafter, the flow returns to block B3 and driving of the cooling fan is controlled in accordance with the temperature measured at block B13.

When the system controller 10 detects a driving error of the cooling fan, that is, when the actual rotation speed of the cooling fan is equal to or lower than the preset threshold rotation speed (YES in block B7), the system controller 10 reads out a value of the number E of times of error detection stored in the RAM and determines whether or not the read number E of error detection is equal to or larger than a preset value N (N=3, for example) (block B8).

When the number E of error detection is equal to or larger than N (YES in block B8), it is determined that the cooling fan has a trouble and the system controller 10 performs a preset error process (block B9). The system controller 10, for example, causes a buzzer 15 to generate an alarm sound to notify the user that the cooling fan has a trouble, and turns off the power source of the projection display apparatus.

When the number E of times of error detection is smaller than N (NO in block B8), the system controller 10 increments the value of the number E of error detection by 1 and stores the result into the storage area provided in the RAM (block B10). Afterward, the system controller 10 sets the target rotation speed of the cooling fan to the maximum rotation speed (about 4000 rpm) of the cooling fan (block B11). Maximum voltage is applied to the cooling fan and the rotation speed of the cooling fan is controlled to become the maximum rotation speed (block B12). Then the flow returns to block B7.

When the maximum rotation speed (4000 rpm, for example) is set as the target rotation speed of the cooling fan, rotation torque of the motor of the cooling fan is increased. As a result, the fixedly solidified grease is gradually softened so as not to obstruct the rotation of cooling fan.

Thereafter, even in the case where a driving error of the cooling fan is newly detected (YES in block B7), the processing from block B10 to block B12 is repeated until the number E of error detection becomes equal to or larger than N. Even in the case where the grease is fixedly solidified on the rotation shaft and is difficult to be softened, setting adequately the value of N allows the maximum rotation speed to be provided to the cooling fan until the grease is sufficiently softened. Once the rotation speed of the cooling fan rises and the grease is softened, the grease will not be solidified again owing to heat generated by friction of the motor, heat generated by the lamp and the like.

When the actual rotation speed of the cooling fan exceeds the threshold rotation speed (NO in block B7), the flow goes to block B13.

Figure 7:
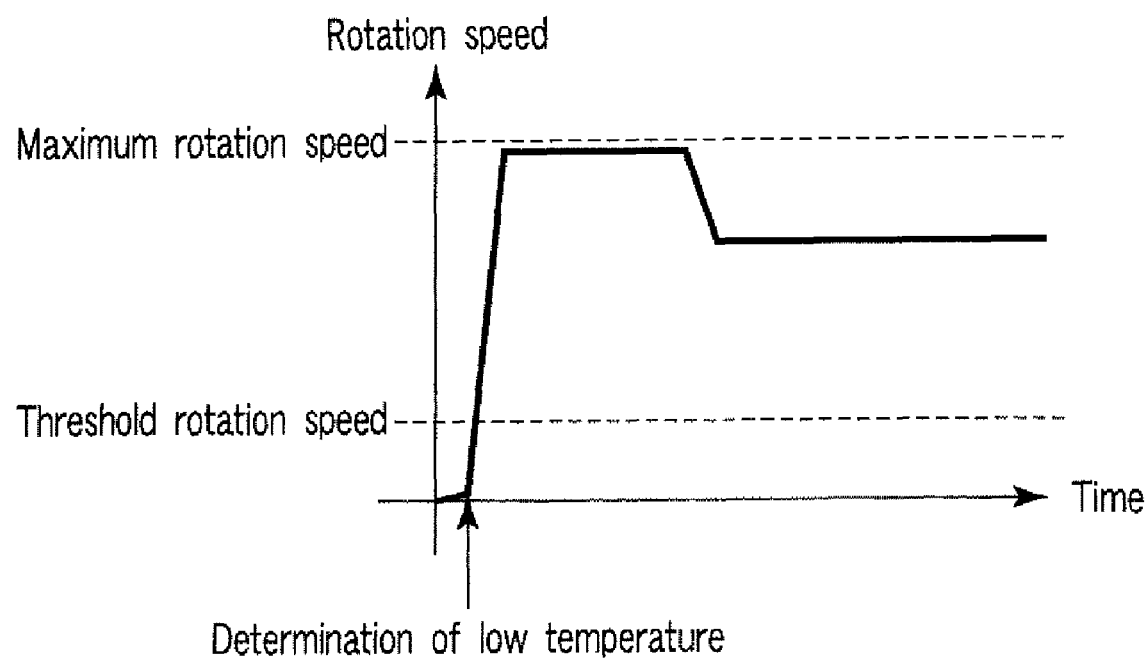
FIG. 7 is an exemplary view schematically showing an example of a temporal change in the rotation speed of the fan when the cooling fan drive process according to the second embodiment is performed in the low-temperature environment.

FIG. 7 is an exemplary view schematically showing an example of a temporal change in the rotation speed of the fan when the cooling fan drive process according to the second embodiment is performed in the low-temperature environment. When it is determined that the environmental temperature is low, for example, below 0° C., the maximum rotation speed of the cooling fan is set as the target rotation speed of the cooling fan. When the grease is softened and the rotation speed exceeds the threshold rotation speed, the rotation speed is converged by means of feedback-control on the target rotation speed which is set depending on temperature.

In the present embodiment, the target rotation speed of the cooling fan is set to the maximum rotation speed (4000 rpm, for example) in the case where the environmental temperature immediately after the startup is low and may cause the grease to be solidified on the rotation shaft. Further, when the rotation speed of the cooling fan does not reach the target rotation speed and a driving error of the cooling fan is detected, the target rotation speed of the cooling fan is set to the maximum rotation speed.

Even in a case where the grease used as a lubricant of the fan motor is fixedly solidified on the rotation shaft due to the low temperature and obstructs the rotation of the cooling fan, when the target rotation speed of the cooling fan is set to the maximum rotation speed, the grease is softened owing to the increase in the rotation torque of the motor. Accordingly, the cooling fan can be normally driven. Therefore, according to the projection display apparatus of the present embodiment, the cooling fan can be driven normally even in the low-temperature environment.

In the present embodiment, the temperature sensor 14 measures the environmental temperature in blocks B1 and B13. However, the temperature sensor 14 may measure the internal temperature of the projection display apparatus. In this case, the target rotation speed of the cooling fan is set based on the internal temperature measured by the temperature sensor 14. Alternatively, the temperature sensor 14 may measure both of the environmental temperature and the internal temperature of the apparatus. The target rotation speed of the cooling fan can be set based on a combination of both of the measured temperatures.

In the present embodiment, the system controller 10 sets the maximum rotation speed of the cooling fan as the target rotation speed of the cooling fan when the environmental temperature detected by the temperature sensor 14 is low and when a driving error of the cooling fan is detected. However, the target rotation speed may be set to a rotation speed other than the maximum rotation speed of the cooling fan, provided the set rotation speed allows the solidified grease to be softened.

In the first and second embodiments described above, an extra-high pressure mercury lamp is used as the lamp; however, another type of lamp may be used. Further, explained is the optical engine utilizing the projection system of the three-LCD system; however, another projection system such as a DLP (registered trademark) system or LCOS system may be used.

In the first and second embodiments described above, when the number of times of error detection exceeds the predetermined number of times (e.g., three times), the system controller 10 executes error processing such as causing the buzzer 15 to generate an alarm sound in order to notify the user that the cooling fan has a trouble, and turning off the power source of the projection display apparatus. Instead of causing the buzzer 15 to generate an alarm sound, an error message may be displayed on the display panel provided on the operation unit 13. Alternatively, both of the operations of generating the alarm sound and displaying the error message may be performed. In addition to generation of the alarm sound and display of the error message, it is also possible to perform another process as long as the process can notify the user that the cooling fan has a trouble.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A projection display apparatus comprising:
   an optical system configured to modulate light from a light source in accordance with an input image signal and to project modulated light onto a screen;
   a cooling fan configured to cool the optical system based on a target rotation speed, the cooling fan comprises a shaft of a motor and a grease on the shaft;
   an error detector configured to detect a driving error of the cooling fan; and
   a target rotation speed controller configured to increase the target rotation speed of the cooling fan to a predetermined rotation speed when the error detector detects the driving error of the cooling fan, wherein the predetermined rotation speed comprises a rotation speed which prevents the grease from being solidified.

2. The projection display apparatus according to claim 1, wherein the error detector is configured to detect the driving error of the cooling fan when a current rotation speed of the cooling fan is not higher than a preset threshold rotation speed.

3. The projection display apparatus according to claim 1, wherein the target rotation speed controller is configured to increase the target rotation speed of the cooling fan to a maximum rotation speed of the cooling fan.

4. The projection display apparatus according to claim 1, further comprising a temperature measuring unit configured to measure a temperature, and wherein the target rotation speed controller is in accordance with the temperature measured by the temperature measuring unit.

5. The projection display apparatus according to claim 1, further comprising:
   a storage unit configured to store a number of times of error detection detected by the error detector; and
   a notifying unit configured to notify a user when the number of times of error detection stored in the storage unit becomes larger than a predetermined number of times.

6. A projection display apparatus comprising:
   an optical system configured to modulate light from a light source in accordance with an input image signal and to project modulated light onto a screen;
   a cooling fan configured to cool the optical system based on a target rotation speed;
   a temperature measuring unit configured to measure a temperature;
   a target rotation speed controller configured to increase the target rotation speed of the cooling fan to a predetermined rotation speed when the temperature measured by the temperature measuring unit is below a predetermined temperature, the predetermined rotation speed for preventing a rotation of the cooling fan from being obstructed; and
   an error detector configured to detect a driving error of the cooling fan,
   wherein the target rotation speed controller is configured to increase the target rotation speed of the cooling fan when the error detector detects the driving error of the cooling fan.

7. The projection display apparatus according to claim 6, wherein the target rotation speed controller is configured to increase the target rotation speed of the cooling fan to a maximum rotation speed of the cooling fan.

8. The projection display apparatus according to claim 6, wherein the error detector is configured to detect the driving error of the cooling fan when a current rotation speed of the cooling fan is not higher than a preset threshold rotation speed.

9. The projection display apparatus according to claim 6, further comprising a target rotation speed setting unit configured to set the target rotation speed of the cooling fan in accordance with the temperature measured by the temperature measuring unit.

10. The projection display apparatus according to claim 6, wherein
    the cooling fan comprises a shaft of a motor and a grease on the shaft, and
    the predetermined rotation speed comprises a rotation speed which prevents the grease from being solidified.

11. A controlling method for a projection display apparatus including an optical system configured to modulate light from a light source in accordance with an input image signal and to project modulated light onto a screen, and a cooling fan configured to cool the optical system, the controlling method comprising:
    cooling the optical system by the cooling fan based on a target rotation speed;
    measuring a temperature;
    increasing the target rotation speed of the cooling fan when the measured temperature is below a predetermined temperature, the predetermined rotation speed for preventing a rotation of the cooling fan from being obstructed;
    detecting a driving error of the cooling fan; and
    increasing the target rotation speed of the cooling fan when the driving error of the cooling fan is detected.

12. A controlling method for a projection display apparatus including an optical system configured to modulate light from a light source in accordance with an input image signal and to project modulated light onto a screen and a cooling fan configured to cool the optical system, the cooling fan comprising a shaft of a motor and a grease on the shaft, the controlling method comprising:
    cooling the optical system by the cooling fan based on a target rotation speed;
    detecting a driving error of the cooling fan;
    increasing the target rotation speed when the driving error of the cooling fan is detected;
    increasing the target rotation speed of a predetermined rotation speed when the driving error of the cooling fan is detected,
    wherein the predetermined rotation speed comprises a rotation speed which prevents the grease from being solidified.

* * * * *